United States Patent [19]
Theising et al.

[11] Patent Number: 5,684,388
[45] Date of Patent: Nov. 4, 1997

[54] SCROLL SAW MOTOR/PRINTED CIRCUIT BOARD HOUSING WITH SWITCH LOCK-OUT

[75] Inventors: John L. Theising; Frank J. Tomiser, Jr., both of St. Louis, Mo.

[73] Assignee: Emerson Electric Co., St. Louis, Mo.

[21] Appl. No.: 509,050

[22] Filed: Jul. 31, 1995

[51] Int. Cl.⁶ .................................................. H02K 7/065
[52] U.S. Cl. ........................... 322/40; 310/50; 322/12; 318/17
[58] Field of Search ................... 310/50, 89; 83/98; 322/40; 200/174

[56] References Cited

U.S. PATENT DOCUMENTS

| | | | |
|---|---|---|---|
| 4,292,571 | 9/1981 | Cuneo | 318/17 |
| 4,328,405 | 5/1982 | Cuneo | 200/157 |
| 4,348,603 | 9/1982 | Huber | 310/50 |
| 4,510,404 | 4/1985 | Barrett et al. | 310/50 |
| 4,616,541 | 10/1986 | Eccardt et al. | |
| 4,668,898 | 5/1987 | Harms et al. | 318/254 |
| 5,197,369 | 3/1993 | Steiner | |

*Primary Examiner*—Steven L. Stephan
*Assistant Examiner*—Nicholas Ponomarenko
*Attorney, Agent, or Firm*—Polster, Lieder, Woodruff & Lucchesi

[57] ABSTRACT

A motor housing for a variable speed scroll saw or other operating tool is disclosed. The motor housing includes a motor as well as a printed circuit board mounted in the motor housing adjacent the motor. A switch is attached to the printed circuit board and extends outside of the motor housing. The switch is also attached to the motor housing. A switch lock-out is operably associated with the housing for disabling the switch until the switch lock-out is disengaged. Preferably, the switch lock-out is a releasable locking mechanism such as a padlock.

6 Claims, 4 Drawing Sheets

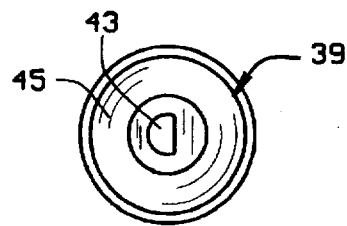
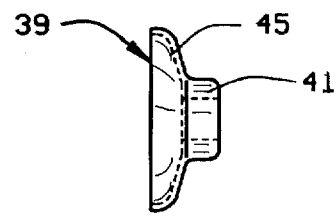
FIG.7  FIG.8
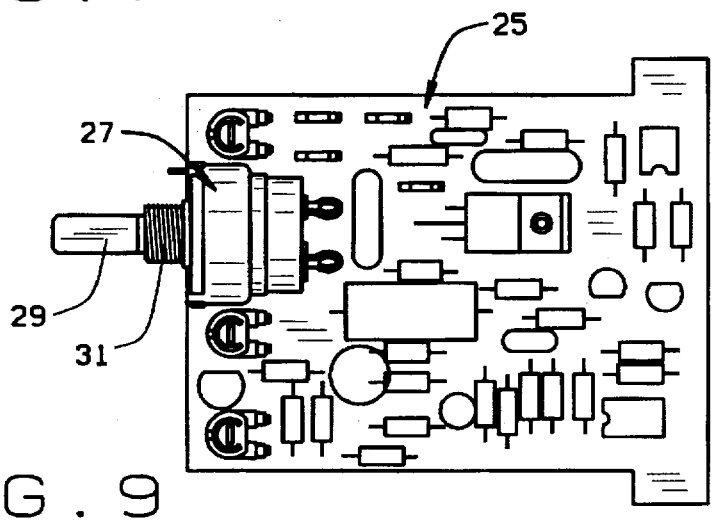
FIG.9
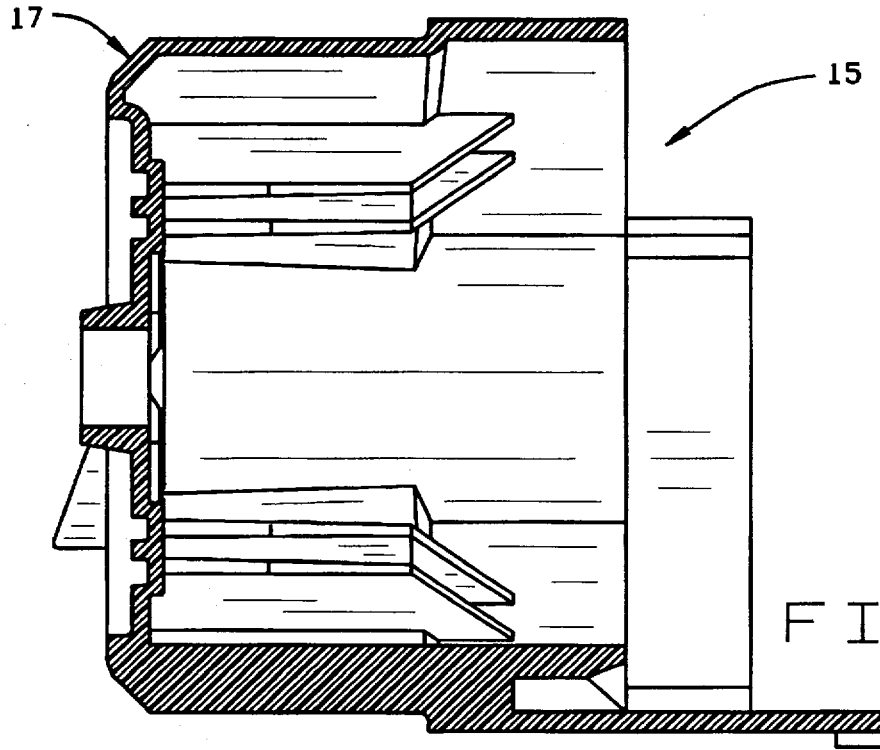
FIG.10

SCROLL SAW MOTOR/PRINTED CIRCUIT BOARD HOUSING WITH SWITCH LOCK-OUT

BACKGROUND OF THE INVENTION

The present invention relates to a motor housing for an operating tool such as a variable speed scroll saw or other similar operating tool.

Variable speed scroll saws require the use of a control board and motor to vary the speed of the scroll saw, as desired. Typically, the control board is a printed circuit board that contains the necessary solid state electronic controls for varying the speed of the motor. Printed circuit boards are conventionally mounted in a separate housing away from the motor housing which adds cost due to the additional parts and mounting hardware that is required. Additionally, the on-off switch for the motor is usually mounted separate from the printed circuit board. This also adds cost due to the additional hardware required to mount the on-off switch and the cost associated with a wiring harness that is required to connect the on-off switch to the printed circuit board.

As will be fully explained in the discussion that follows, the present invention discloses a motor housing for an operating tool such as a variable speed scroll saw in which a printed circuit board is not only capable of being mounted in the motor housing adjacent the motor with a switch attached to both the printed circuit board and the motor housing, but also incorporates a unique switch lock-out mechanism that is built into the motor/printed circuit board housing to prevent inadvertent/undesired operation of the scroll saw, until the switch lock-out mechanism is disengaged.

SUMMARY OF THE INVENTION

Among the several objects and advantages of the present invention include:

The provision of a new and improved motor housing for an operating tool such as a variable speed scroll saw or the like which secures a printed circuit board within the motor housing with a minimum amount of hardware;

The provision of the aforementioned new and improved motor housing that includes a switch that is not only secured to the printed circuit board, but also to the motor housing as well, to eliminate unnecessary hardware, wire harnesses and the like;

The provision of the aforementioned new and improved motor housing which includes a switch lock-out mechanism that is operably associated with the motor housing;

The provision of the aforementioned new and improved motor housing in which the switch is a pull-on/push-off switch that is engaged by the switch lock-out mechanism until the switch lock-out mechanism is disengaged in a desired manner;

The provision of the aforementioned new and improved motor housing with a switch lock-out mechanism that provides a releasable locking device that can be quickly engaged and disengaged as desired;

The provision of the aforementioned new and improved motor housing which requires a minimum number of parts, provides a reliable and secure lock-out system, facilitates engagement and removal of the lock-out system as desired; provides a strong yet inexpensive molded-in-place plastic motor housing utilizing inexpensive tooling, and provides a compact and favorable appearance/design, as compared to other prior art products.

Briefly stated, the present invention provides a motor housing for an operating tool such as a variable speed scroll saw or the like which includes a motor mounted in the motor housing, a printed circuit board mounted in the motor housing adjacent the motor and a switch attached to the printed circuit board which extends outside of the motor housing, the switch also being attached to the motor housing. In conjunction with the above elements, a switch lock-out mechanism may be operably associated with the housing for disabling the switch until the switch lock-out is disengaged.

For securing the switch to the housing, the switch may include a threaded shank that extends through an opening in the motor housing. A nut may be used to threadably engage the threaded shank of the switch outside of the housing for securing the printed circuit board to the motor housing.

Where a pull-on/push-off switch is used, a pull-on/push-off shank of the switch may be provided within the threaded shank to enable operation of the pull-on/push-off switch while also threadably securing the switch to the motor housing in the manner described above.

Where a switch lock-out is operably associated with the housing for disabling the switch until the switch lock-out is disengaged, a padlock may be used in conjunction with the switch lock-out to facilitate quick engagement and disengagement of the switch lock-out. For this purpose, the padlock is preferably received within a housing slot adjacent the switch for engaging and preventing movement of the switch, until the switch lock-out is disengaged. In a pull-on/push-off switch, a gripping knob and an adjacent knob finger guard are preferably provided. The knob finger guard is located in proximity to the housing for engagement by the switch lock-out. This engagement is preferably accomplished through the padlock which engages the knob finger guard to prevent movement of the pull-on/push-off switch by the gripping knob, until the padlock is removed.

These and other objects and advantages of the present invention will become apparent from the description that follows.

BRIEF DESCRIPTION OF THE DRAWINGS

In the drawings.

FIG. 7 is an end elevational view of the knob finger guard associated with the pull-on/push-off switch illustrated in the drawings;

FIG. 8 is a side elevational view of the knob finger guard shown in FIG. 7;

FIG. 9 is an enlarged view of the printed circuit board with attached switch; and FIG. 10 is a sectional view of the motor housing as viewed along lines 10—10 of FIG. 2.

Corresponding reference numerals will be used throughout the various figures of the drawings.

DESCRIPTION OF THE PREFERRED EMBODIMENTS

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

Figure 1:
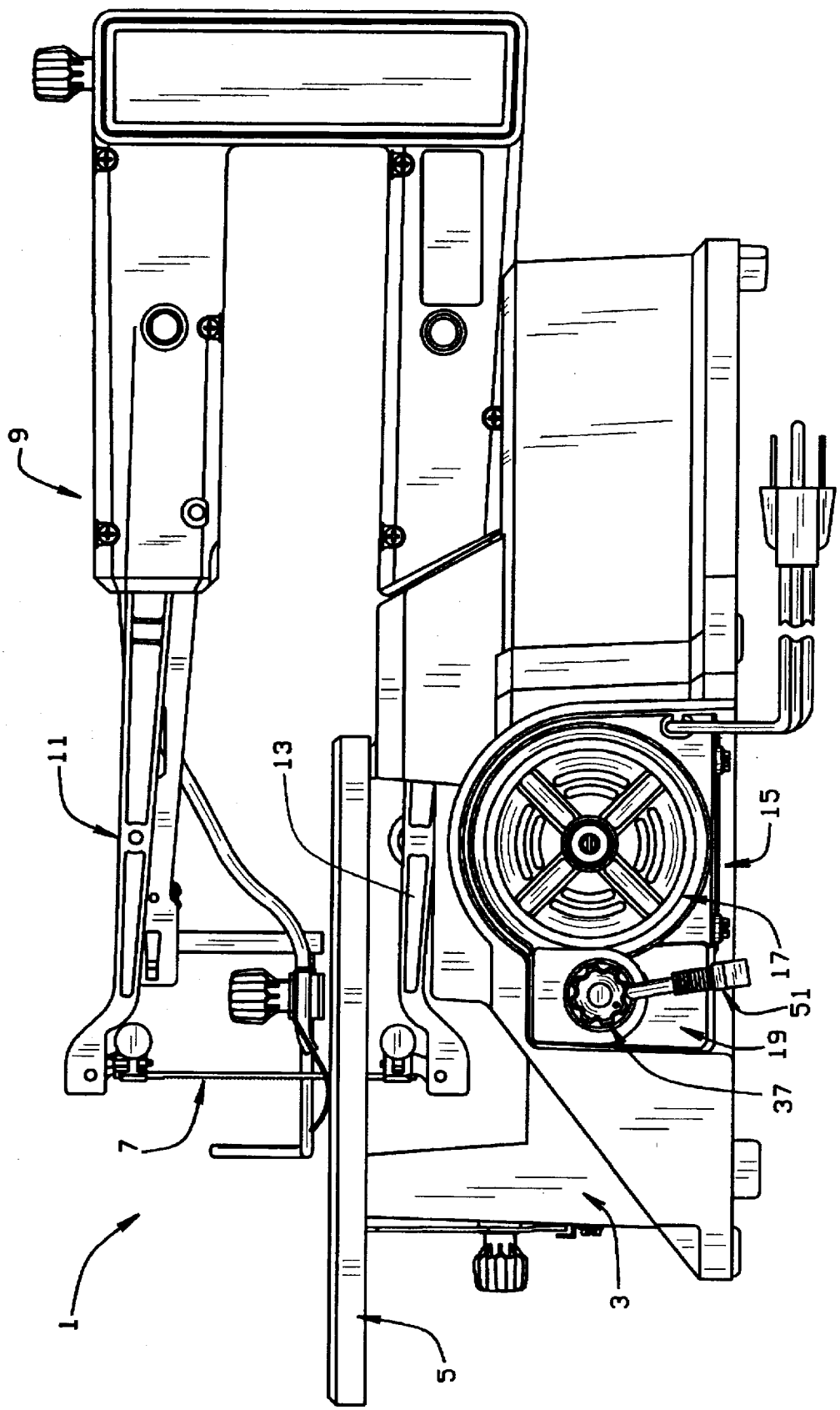
FIG. 1 is a side elevational view of a variable speed scroll saw which incorporates the new and improved features associated with the motor housing of the present invention.
Figure 2:
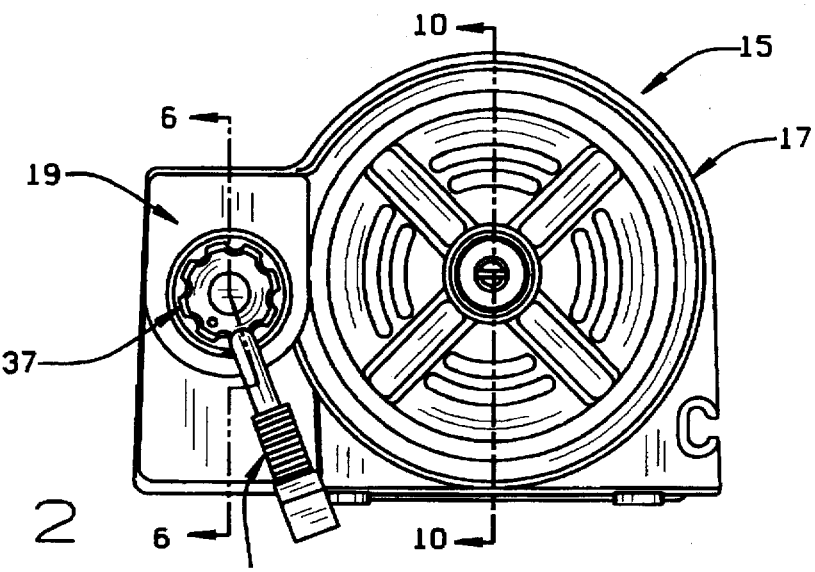
FIG. 2 is a side elevational view of the motor housing only with the switch lock-out mechanism.
Figure 3:
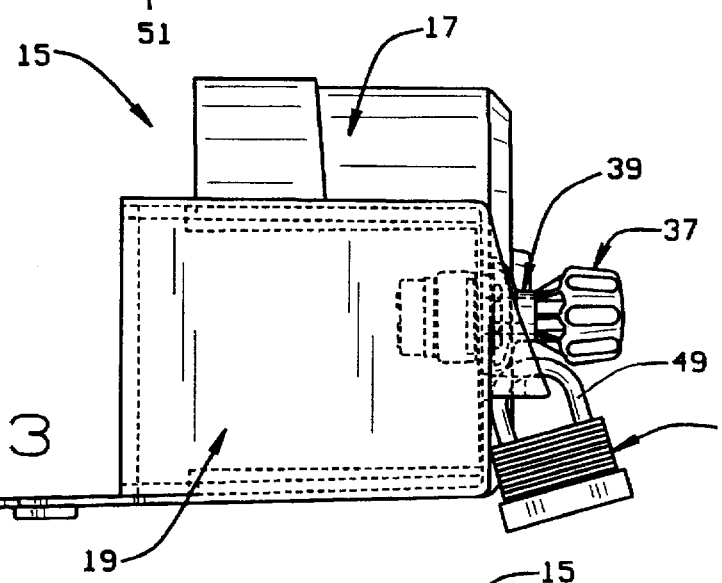
FIG. 3 is an end elevational view of the motor housing with switch lock-out mechanism shown in FIG. 2.

The general construction of a scroll saw 1 is illustrated in FIG. 1 of the drawings. The scroll saw is shown as including a base 3 that supports a worktable 5 on which workpieces rest for desired curing. A scroll saw blade 7 extends through a slot (not shown) in the worktable 5 for cutting workpieces in a desired manner. It will be noted that the worktable 5 extends within the opening of a C-shaped frame 9 which is mounted to the frame 3. The scroll saw blade 7 is connected at opposite ends to upper and lower supporting arms 11, 13 which are arranged to rock or pivotally move through the C-shaped frame 9, in order to enable the scroll saw blade 7 to reciprocate for cutting workpieces supported by the worktable 5. The upper and lower supporting arms 11, 13 are pivotally mounted to C-shaped frame 9 mounted to the frame 3 in a typical manner in order to allow a motor (not shown) contained within the motor housing 15 to pivot or rock the arms 11, 13. In this manner, the desired reciprocating motion for the upper and lower arms 11, 13 is accomplished.

The aforementioned description of the general construction and operation of the scroll saw 1 illustrated in FIG. 1 of the drawings will facilitate an understanding of the environment in which the present invention is used; however, in order to understand the new and improved features of the scroll saw motor housing 15, reference is made to FIG. 2-10 of the drawings In conventional variable speed scroll saws, a printed circuit board including variable speed controls is typically mounted separate from the motor. As will be appreciated, this creates additional parts, mounting hardware and added cost. As will be seen from the description that follows, the present invention not only solves the mounting of a printed circuit board in a motor housing with a switch attached to both the printed circuit board and the housing, but also solves the problems of locking out the switch.

Figure 4:
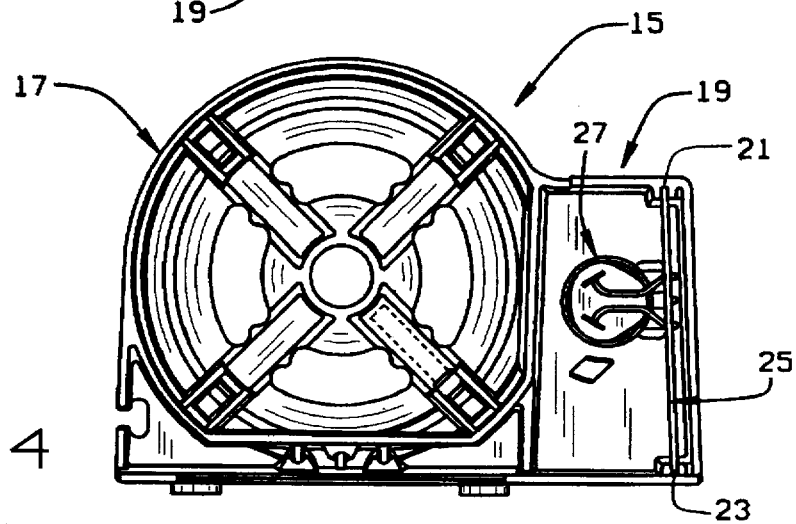
FIG. 4 is a side elevational view of the motor housing from one end thereof which illustrates the manner in which a motor and the printed circuit board are mounted in the motor housing.

As illustrated in FIGS. 2–10 of the drawings, the motor housing 15 is preferably a plastic motor housing constructed in the shape and design illustrated. The motor housing 15 includes a motor housing section 17 and an adjacent printed circuit board housing section 19. As best seen in FIGS. 4 and 10 of the drawings, the motor housing section 17 is constructed with various ribs and reinforcing elements in order to contain and totally enclose a motor (not shown).

Figure 5:
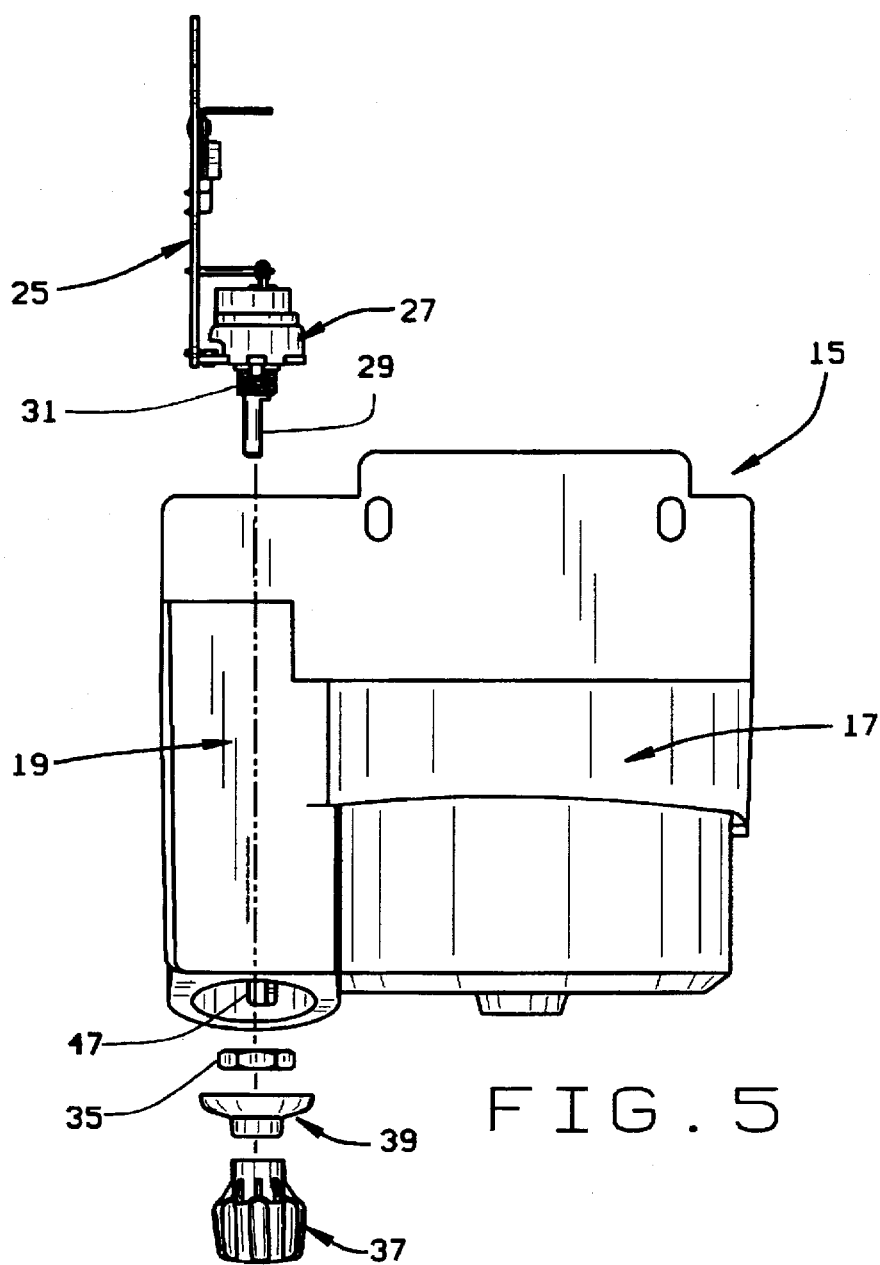
FIG. 5 is an exploded top plan view illustrating the method of assembling the printed circuit board with attached switch to the motor housing in accordance with the present invention.

The adjacent but separate printed board section 19 of the motor housing 15 includes, as best seen in FIG. 4 of the drawings, upper and lower slots 21, 23 for receiving the printed circuit board 25 in a vertically oriented position within the motor housing 15. In FIG. 5 of the drawings, the printed circuit board 25 is shown just prior to its insertion into the printed circuit board compartment 19 of the motor housing 15.

For securing the printed circuit board 25 within the motor housing 15, it will be noted that a switch 27 is mounted directly to the printed circuit board 25 at its leading edge. In addition to being secured to the printed circuit board 25, the switch 27 is also secured to the motor housing 15, in a manner now to be described.

Figure 6:
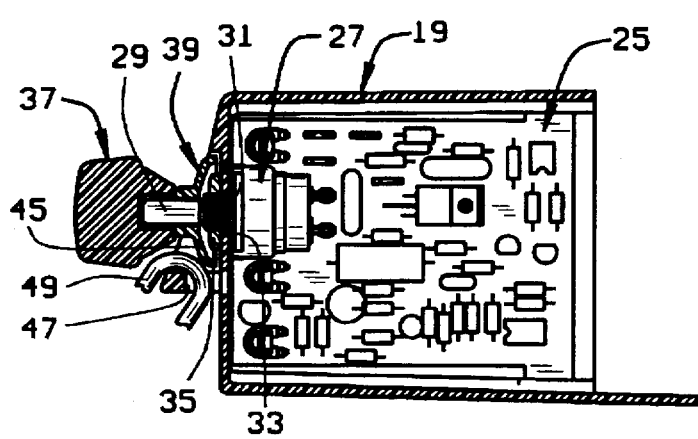
FIG. 6 is a side elevational view, partly in section, taken along lines 6—6 of FIG. 2, and illustrating the manner in which the printed circuit board is mounted within the motor housing and its associated switch is also mounted directly to the motor housing.

The switch 27 is preferably a pull-on/push-off switch which includes a pull-on/push-off shank element 29 and a threaded shank 31 which surrounds the pull-on/push-off shank element 29, as best seen in FIGS. 5–6 and 9 of the drawings. The pull-on/push-off shank element 29 and surrounding threaded shank 31 of the pull-on/push-off switch 27 extends through an opening 33 in the printed circuit board compartment section 19 of the motor housing 15. This enables a nut 35 to threadably engage a threaded shank 31 of the pull-on/push-off switch 27 for securing the switch 27 to the printed circuit board housing section 19, as best illustrated in FIG. 6 of the drawings. By mounting the printed circuit board 25 within the printed circuit board housing section 19 and by also mounting the switch 27 to the printed circuit board 25 as well as to the printed circuit board housing section 19, additional parts, mounting hardware and wiring harnesses are eliminated, as compared to prior art designs.

For operating the pull-on/push-off switch 27, a knurled gripping knob 37 is mounted over the pull-on/push-off shank element 29 adjacent a knob finger guard 39, also mounted to the pull-on/push-off shank element 29 while surrounding and overlying the threaded shank and nut 31, 35 respectively, as best seen in FIG. 6 of the drawings. The knob finger guard 39, as best seen in FIGS. 7–8, includes a collar portion 41 with a D-shaped opening 43 for non-rotational mounting relative to the pull-on/push-off shank element 29, as well as a skirt section 45 for overlying the threaded shank 31 and nut 35, as shown in FIG. 6. The knob finger guard 39 also functions in connection with the switch lock-out mechanism of the present invention.

Specifically, a slot 47 is formed in the printed circuit board housing section 19 of the motor housing 15 for receiving the shackle 49 of a padlock 51. As best illustrated in FIG. 6 of the drawings, the shackle 49 of the padlock 51 engages the skirt section 45 of the knob finger guard 39 when received within the slot 47. As a result, the pull-on/push-off switch 27 can not be operated since the shackle 49, by engaging the skirt section 45 of the knob finger guard 39, prevents a user from pulling on the knurled gripping knob 37 of the pull-on/push-off switch 27. However, once the padlock 51 is removed, the pull-on/push-off switch 27 can easily be operated by the gripping knob 37.

From the foregoing, it will now be appreciated that the novel and unique manner in which the printed circuit board housing section 19 accepts a printed circuit board in an adjacent position to a motor within the motor housing 15 can eliminate many parts and additional hardware, that are presently required to mount a printed circuit board separate from the motor housing as in prior art designs. Furthermore, the manner in which the printed circuit board switch is both mounted to the printed circuit board as well as being mounted to the housing eliminates additional parts, hardware and wiring harnesses. Finally, the switch lock-out mechanism of the present invention cannot be easily defeated or damaged since it provides a positive and reliable engagement/disengagement mechanism, unlike any designs of the prior art.

In view of the above, it will be seen that the several objects and features of this invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

We claim:

1. An operating tool motor housing including:

a motor mounted in the motor housing;

a printed circuit board mounted in the motor housing adjacent the motor; a pull on/push off switch connected to the printed circuit board and extending outside of the housing;

a lockable switch lock-out device operably associated with said housing and said switch for disabling the switch until the lockable switch lock-out device is disengaged, the lockable switch lock-out device engaging the pull-on/push-off switch to prevent movement thereof until the lockable switch lock-out device is disengaged; and the lockable switch lock-out device including a padlock received in a housing slot adjacent the pull-on/push-off switch for engaging and preventing movement of the pull-on/push-off switch.

2. The motor housing as defined in claim 1 in which the printed circuit board is secured to the housing through the switch.

3. The motor housing as defined in claim 2 in which the switch includes a threaded supporting shank for the switch that extends through an opening in said housing, and a nut threadably engages the threaded supporting shank of the switch outside of said housing for securing the printed circuit board to said housing.

4. The motor housing as defined in claim 3 including a gripping knob and an adjacent knob finger guard for the pull-on/push-off switch, said knob finger guard being located in proximity to said housing, and said padlock engaging the knob finger guard to prevent movement of the pull-on/push-off switch by said gripping knob.

5. A scroll saw motor housing including:

a motor housing section for receiving a motor;

an adjacent printed circuit board housing section for receiving a printed circuit board adjacent to the motor;

a pull-on/push-off switch attached to the printed circuit board and including a pull-on/push-off shank that extends through said printed circuit board housing, said pull-on/push-off switch being attached to said printed circuit board housing, the pull-on/push-off shank of said pull-on/push-off switch extending outside of said housing including a gripping knob for pull-on/push-off operation and a knob finger guard surrounding the pull-on/push-off shank in proximity to said housing; and a lockable switch lock-out device for engaging the knob finger guard of said pull-on/push-off switch to prevent operation of the pull-on/push-off switch until the lockable switch lock-out device is disengaged;

the pull-on/push-off switch including a threaded supporting shank surrounding the pull-on/push-off shank of said pull-on/push-off switch and also extending outside of said printed circuit board housing, and a nut threadably engaging the threaded shank of said pull-on/push-off switch outside of said printed circuit board housing for securing the printed circuit board to said printed circuit board housing; and, padlock being received in a housing slot of the printed circuit board housing adjacent the knob finger guard for engaging same to prevent movement of the pull-on/push-off shank of the pull-on/push-off switch until the padlock is removed.

6. A scroll saw motor housing including:

a motor housing section for receiving a motor;

an adjacent printed circuit board housing section for receiving a printed circuit board adjacent to the motor;

a pull-on/push-off switch attached to the printed circuit board and including a pull-on/push-off shank that extends through said printed circuit board housing, said pull-on/push-off switch being attached to said printed circuit board housing, the pull-on/push-off shank of said pull-on/push-off switch extending outside of said housing including a gripping knob for pull-on/push-off operation and a knob finger guard surrounding the pull-on/push-off shank in proximity to said housing; and a lockable switch lock-out device for engaging the knob finger guard of said pull-on/push-off switch to prevent operation of the pull-on/push-off switch until the lockable switch lock-out device is disengaged, the lockable switch lock-out device comprising a padlock that engages the knob finger guard.

* * * * *